(12) United States Patent
Menon et al.

(10) Patent No.: US 10,802,481 B1
(45) Date of Patent: Oct. 13, 2020

(54) SITE LOCAL SERVERS FOR VEHICLE MANAGEMENT

(71) Applicant: Kitty Hawk Corporation, Palo Alto, CA (US)

(72) Inventors: Kizhedath Rohith Menon, Fremont, CA (US); Kosuke Hata, San Francisco, CA (US); Kentaro Kawamoto, Orinda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/723,175

(22) Filed: Dec. 20, 2019

(51) Int. Cl.
| | |
|---|---|
| *G05D 1/00* | (2006.01) |
| *G08G 5/00* | (2006.01) |
| *G07C 5/00* | (2006.01) |
| *G06F 8/656* | (2018.01) |
| *B64C 11/46* | (2006.01) |
| *B64C 27/08* | (2006.01) |
| *G06F 8/71* | (2018.01) |

(52) U.S. Cl.
CPC ............ *G05D 1/0022* (2013.01); *B64C 11/46* (2013.01); *B64C 27/08* (2013.01); *G05D 1/0016* (2013.01); *G06F 8/656* (2018.02); *G06F 8/71* (2013.01); *G07C 5/008* (2013.01); *G08G 5/0013* (2013.01)

(58) Field of Classification Search
CPC ........ G05D 1/0022; G06F 8/656; B64C 11/46
See application file for complete search history.

(56) References Cited

U.S. PATENT DOCUMENTS

| | | | |
|---|---|---|---|
| 6,173,159 B1 * | 1/2001 | Wright | H04B 7/18506 340/3.5 |
| 6,259,977 B1 * | 7/2001 | Mayer | B64D 43/00 360/31 |
| 8,335,601 B2 * | 12/2012 | Sham | B64F 5/60 340/3.1 |
| 8,509,963 B1 * | 8/2013 | Barnes | G06F 11/3013 340/540 |
| 9,346,562 B2 * | 5/2016 | Wolfe | G06F 16/93 |
| 2007/0027589 A1 * | 2/2007 | Brinkley | G08G 5/0013 701/3 |
| 2007/0115938 A1 * | 5/2007 | Conzachi | G07C 5/008 370/352 |
| 2010/0312420 A1 * | 12/2010 | Sham | G06Q 10/00 701/3 |
| 2015/0019065 A1 * | 1/2015 | Bollapragada | B64F 5/40 701/29.1 |
| 2017/0274983 A1 * | 9/2017 | Beckman | B64C 11/48 |
| 2019/0340933 A1 * | 11/2019 | Villa | G06Q 10/06315 |

* cited by examiner

*Primary Examiner* — Ramsey Refai
(74) *Attorney, Agent, or Firm* — Van Pelt, Yi & James LLP

(57) ABSTRACT

An electronic vertical takeoff and landing (eVTOL) multicopter which includes a communications interface configured to establish a communication channel between a site local server and the eVTOL multicopter and send a vehicle identifier and vehicle state information from the eVTOL multicopter to the site local server. The eVTOL multicopter also includes a processor configured to perform a management operation received from the site local server, wherein the site local server is configured to determine the management operation based at least in part on the vehicle identifier and the vehicle state information.

16 Claims, 13 Drawing Sheets

|       1000       |       1002       |      1004      |        1006        |      |
| :--------------: | :--------------: | :------------: | :----------------: | ---- |
| User ID          | Vehicle ID       | Version ID     | Timestamp          |      |
| Engineer_1       | Vehicle_1        | A01            | Jan-1-2019, 14:28:12 | 1010 |
| Engineer_2       | Vehicle_1        | B01            | Mar-15-2019, 10:28:12 | 1012 |
| Engineer_2       | Vehicle_2        | B01            | Mar-15-2019, 10:32:50 | 1014 |

FIG. 10

SITE LOCAL SERVERS FOR VEHICLE MANAGEMENT

BACKGROUND OF THE INVENTION

New types of vehicles are being developed for use by less experienced pilots or drivers. For example, Kitty Hawk Corporation is developing an ultralight, open cockpit vehicle which an unlicensed pilot is capable of flying. In the course of developing such a vehicle, prototypes were often tested in remote areas. New types of devices and/or systems to support vehicles in such remote locations would be useful and/or desirable.

BRIEF DESCRIPTION OF THE DRAWINGS

Various embodiments of the invention are disclosed in the following detailed description and the accompanying drawings.

FIG. 10 is a diagram illustrating an embodiment of a table that stores vehicle and version information by appending new entries to the table.

DETAILED DESCRIPTION

Figure 1:
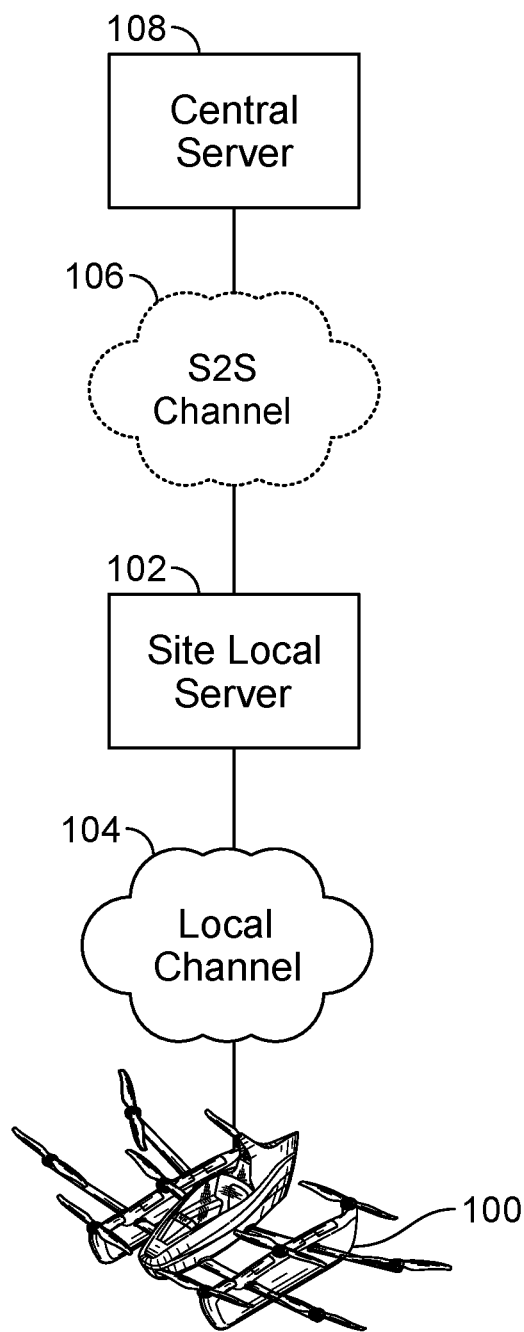
FIG. 1 is a diagram illustrating an embodiment of a system which uses a site local server to manage one or more vehicles in the vicinity of the site local server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a system for managing a vehicle (e.g., an aircraft, a car, etc.) are described herein. In some applications, the vehicle is located in a remote area with slow, unreliable, and/or expensive communication channels or network access which makes managing such vehicles difficult. Deploying or otherwise using a site local server in such areas makes managing the vehicles easier and/or better in some regard (e.g., automatically updating the vehicles over the air, automatically analyzing log files to identify any anomalies or potential problems in the vehicles, all of which may be done without requiring access to a central (e.g., cloud-based) server). In some embodiments, the vehicle is an electronic vertical takeoff and landing multicopter, comprising: a communications interface configured to establish a communication channel between a site local server and the electronic vertical takeoff and landing multicopter and send a vehicle identifier and vehicle state information from the electronic vertical takeoff and landing multicopter to the site local server. The multicopter (at least in this embodiment) includes a processor which performs a management operation received from the site local server, wherein the site local server is configured to determine the management operation based at least in part on the vehicle identifier and the vehicle state information.

In some embodiments, a version of software is identified using a signature of the software. For example, a hash may be generated from the software binary so that different versions of software (e.g., V1, V2, etc.) produce different hashes (or, more generally, signatures). Using a hash or other signature to identify the version of the software is also useful because it may help to identify versions of the software that may have been compromised (e.g., hacked, carry viruses, etc.) and do not match legitimate versions of the software that are known and/or registered with the system.

FIG. 1 is a diagram illustrating an embodiment of a system which uses a site local server to manage one or more vehicles in the vicinity of the site local server. For simplicity and ease of explanation, a single vehicle (100) and a single site local server (102) are shown in this example but multiple vehicles may be managed by a single site local server in some cases and/or there may be multiple site local servers at various locations. In the example shown, the vehicle (100) is an aircraft. In some other embodiments, some other type of vehicle (e.g., a car, an electronic device, etc.) is managed by the site local server (102).

The vehicle (100) and the site local server (102) communicate via a local channel (104). As will be described in more detail below, in some embodiments, the local channel is a wireless channel (e.g., a WiFi channel). Various examples of techniques to establish a communication channel between the vehicle (100) and the site local server (102) in a convenient and/or secure manner are described in more detail below.

The site local server (102) identifies or otherwise determines management operations (if any) to perform based on a (e.g., unique) vehicle identifier and the vehicle's state. For example, if the site local server is used to update a vehicle's software (e.g., firmware), different vehicles may be updated to or with different versions of software. For example, a test vehicle may be running a developer or test version of the software whereas a production or fleet vehicle has a verified or released version of software.

In another example, where an occupant pilots or otherwise controls the vehicle at least some of the time, some vehicles for younger and/or less experienced people have a reduced or safer version of the software (e.g., lower speed limits, lower altitude restrictions, more limited functionality such as requiring that takeoffs and/or landings must be performed autonomously and not by the occupant, etc.). In contrast, an older and/or more experienced pilot may be permitted to use a vehicle running a less restrictive version of the software.

Or, if the management operation is associated with identifying anomalies and/or monitoring a vehicle's health, the vehicle identifier enables the site local server (e.g., analyzing the log files of various vehicles in the vicinity of the site local server) to uniquely identify which vehicle has an anomaly if any are identified.

The site local server (102) communicates with a central server (108) over a server to server (S2S) channel (106) to manage the vehicle. For example, if the site local server is associated with software updates, new updates or versions of the software may be propagated from the central server (108) to the site local server (102). The central server, in turn, may receive new software updates from a version control system (not shown) that stores and manages the different versions of software (i.e., binaries) as well as metadata associated with the various versions (e.g., tags, version number, creation/release date, notes, etc.). Or, for anomaly flagging or health monitoring, the site local server may pass vehicle identifiers and compacted summaries to the central server.

In many applications, it is important for the described system to be secure. To that end, in some embodiments, a pull model or paradigm is used between the central server (108) and the site local server (102) and/or between the site local server (102) and the vehicle (100). For example, instead of using a push model where the site local server exposes a port, service, or other interface to the central server (e.g., where the exposed port would be vulnerable to attack), it may be safer to pull information from rather than push it. For example, the site local server would pull any information (e.g., a software update) from the central server. Similarly, in some embodiments, a pull model is used between a vehicle and a site local server. For example, instead of exposing a port to which software updates or other information is pushed, the vehicle pulls such information from the site local server. A vehicle in such embodiments therefore does not expose a port or interface which would present a target for attack.

In addition to and/or as an alternative to using a pull model, other techniques may be employed for security. For example, in some embodiments, communication over the server to server channel (106) and/or local channel (104) is encrypted. In some embodiments, each pair (e.g., comprising a central server and a given site local server, or comprising a given site local server and a given vehicle) has a unique pair of authentication credentials (e.g., passwords, keys, etc.).

The site local server is designed to manage vehicles in environments where the server to server channel (106) is unreliable, slow, and/or intermittent. The following figure shows an example of this.

Figure 2:
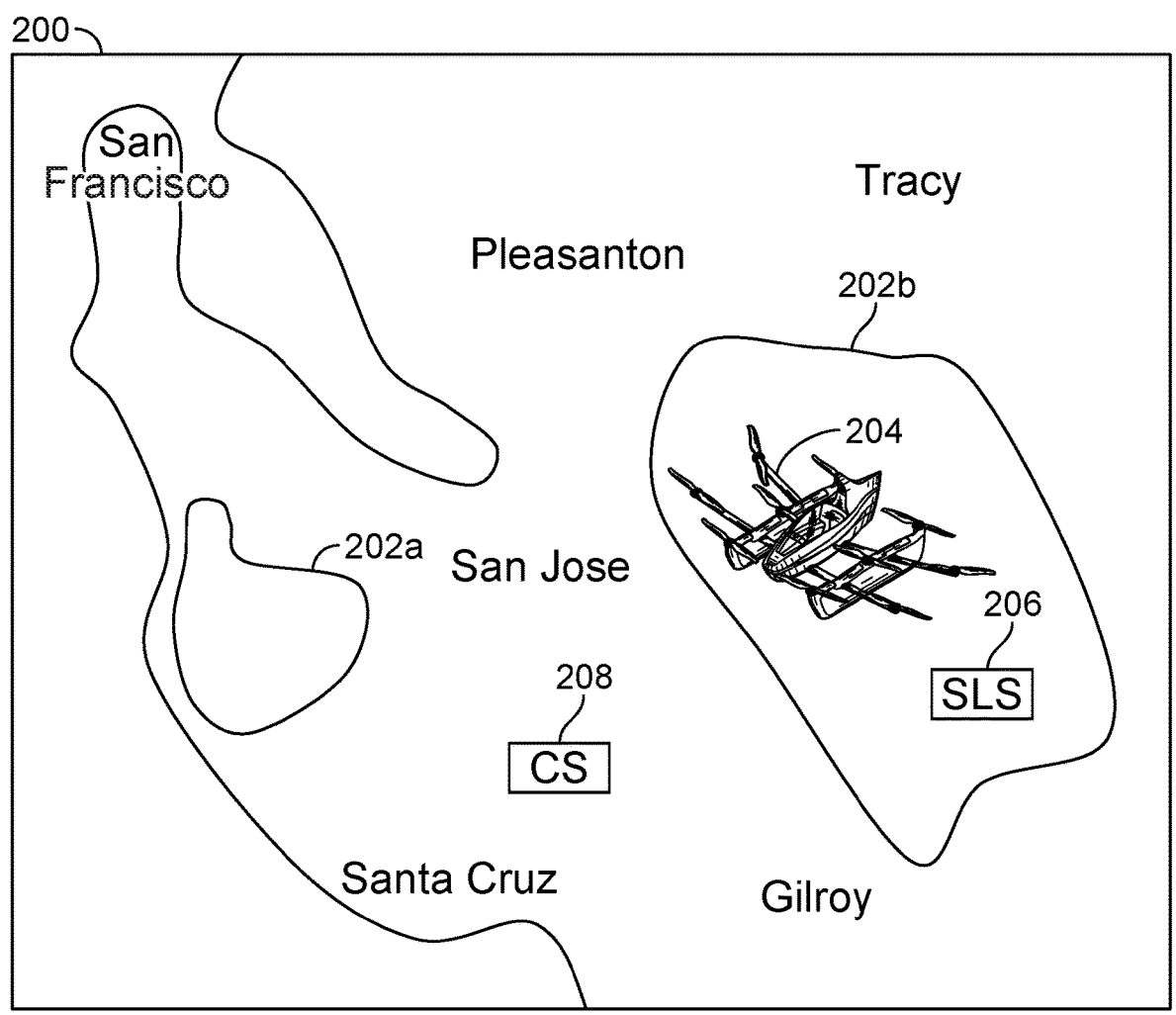
FIG. 2 is a diagram illustrating an embodiment of a cellular data network coverage map.

FIG. 2 is a diagram illustrating an embodiment of a cellular data network coverage map. In the example shown, the coverage map (200) shows areas in the San Francisco Bay Area where access to a cellular data network (e.g., 4G, 5G, etc.) is available versus unavailable. In this example, the coverage map has two dead zones (202a and 202b). In one example application, one or more vehicles (204) operate in dead zone (202b). To maintain the vehicles, one or more site local servers (206) are located within that dead zone. The site local server may establish a local WiFi network in order to communicate with vehicles in the range of the site local server.

The central server (208) is located outside of the dead zones (202a and 202b). However, due to the lack of cellular data network coverage where the site local server is located, the central server cannot communicate with the site local server over the cellular data network. In some embodiments, to communicate, a radio channel or satellite channel is established as the server to server channel, but such radio and satellite channels are relatively slow, unreliable, and/or expensive.

Site local servers permit vehicles to be managed, even in locations where communication channels are relatively slow, unreliable, and/or expensive. Since the site local server is able to operate independently of the central server, the site local server can perform management operations even if the central server is (e.g., temporarily) unavailable. When the server to server channel is available, the site local server communicates with the central server as needed (e.g., to receive new software updates or to send error and/or anomaly reports as appropriate). For example, multicopter (100) shown in FIG. 1 (which is an electronic vertical takeoff and landing (eVTOL) open-cockpit ultralight multicopter with 10 rotors capable of taking off from and landing on land or water) has been tested in sparsely populated areas, such as on the South Island of New Zealand and the south and/or eastern part of Santa Clara County in California where there is no cell signal (i.e., a dead zone).

The exemplary vehicle shown (e.g., (100) in FIG. 1 and (204) in FIG. 2) in particular may require the support of a site local server because of is design and/or target user compared to other types of vehicles. Unlike many other vehicles, the exemplary vehicle shown is designed to be flown by relatively inexperienced pilots (e.g., without a pilot's license and the required flight time to acquire such a license). To make the vehicle easy to fly for inexperienced pilots, the vehicle relies heavily on its software. As such, during development, the vehicle is frequently updated with new versions of the (e.g., flight critical) software as bugs are fixed and features are added. However, prototypes of the vehicle were tested in remote areas, as described above. Before the development of site local servers, the vehicles would have to be laboriously updated individually using a wired connection and it was difficult to know which vehicles had what version and/or to quickly roll up updates.

In some embodiments, the site local server is battery powered. For example, this permits a site local server to be used in locations where there is no power supply. It is not necessary for the site local servers to be "up" constantly for the vehicles to operate, so it may be acceptable to periodically power down a site local server and swap out a depleted (or nearly depleted) battery with a fully charged battery.

Similarly, in some embodiments, a site local server may include removable memory or storage. This may be attractive in applications where the amount of information to be exchanged between the central server and the site local server far surpasses the bandwidth and/or reliability of the server to server channel to transfer that amount of information. For example, suppose a vehicle is still being developed and is being tested in a remote location with expensive and/or slow communication channels. Since the vehicle is still under development, it is desirable to have all log files, in their entirety, available for review. This is a relatively large amount of information. In that application, it may be faster and/or less expensive to store the massive log files on removable memory in the site local server, remove the removable memory (e.g., after safely powering down the site local server), and transport the removable memory to a location with better access to the network and/or communication channels. Alternatively, the entire site local server may be transported (e.g., via a truck or even via one of the vehicles being managed by the site local server) to a location with better network access and/or communication channels where the site local server can communicate with the central server as needed.

Having a system available which can securely and conveniently manage vehicles (e.g., ensuring that all of the software is up-to-date) in remote locations is of particular interest to the exemplary vehicle shown because of the software-intensive nature of the vehicle. Unlike many other vehicles, the exemplary vehicle (204) is able to be flown by inexperienced and/or unlicensed pilots. To achieve that goal, the vehicle is heavily reliant upon the flight computer software (e.g., it prevents the pilot from performing dangerous maneuvers, may sometimes switch from a more manual or user-controlled flight mode to a more autonomous flight mode, etc.). As such, during development and/or testing of the vehicle, the software on the vehicle may be updated much more frequently compared to other types of vehicles which instead rely upon the experience of the pilot. With the techniques described herein, technicians no longer have to manually update each vehicle (some of which may be located in remote places). Instead, the exemplary systems now permit (frequent) software updates (or other management operations) to be rolled out faster in a targeted manner if desired to a fleet of vehicles which may be spread out geographically, including to remote locations. This is faster and more accurate, for example, than having technicians manually and laboriously update the software on each vehicle. Some vehicles may not be updated (e.g., technician forgets to update a vehicle) and/or the vehicles may be required to come in to a maintenance yard or shop, which is time consuming and inconvenient.

Even after development has completed, a site local server is useful in managing the exemplary vehicle. For example, suppose that vehicle 204 is one of a fleet of easy-to-fly vehicles for recreational use by relatively inexperienced pilots or users in a remote area. One of the vehicles may be solely used by an instructor or supervisor and as such is configured with a less restrictive version of the software (e.g., more permissive altitude and/or speed limits, more aggressive maneuvering or flight envelope permitted, etc.) whereas the other vehicles (which are intended for use by the users or customers) have a more restrictive version of the software. If a problem develops with the instructor or supervisor's vehicle and it would take some time for the vehicle to be repaired (e.g., the vehicle has to be towed to a maintenance facility), a person at the site (e.g., the instructor, supervisor, or a technician) can log onto or otherwise access the site local server (e.g., (206)), change a table so that another vehicle (e.g., previously loaded with the more restrictive version of the software) is set to have or otherwise is associated with the more permissive version of the software. It is noted that this can be made without requiring a server to server connection between central server (208) and site local server (206). The site local server then updates the designated vehicle with the designated, more permissive version of the software and the instructor or supervisor can then use that vehicle. This permits the maximum number of student or customer vehicles at any given time while also enabling the instructor or supervisor to have a vehicle even if their vehicle becomes disabled or otherwise not airworthy.

The following figure describes this example more generally and/or formally in a flowchart.

Figure 3:
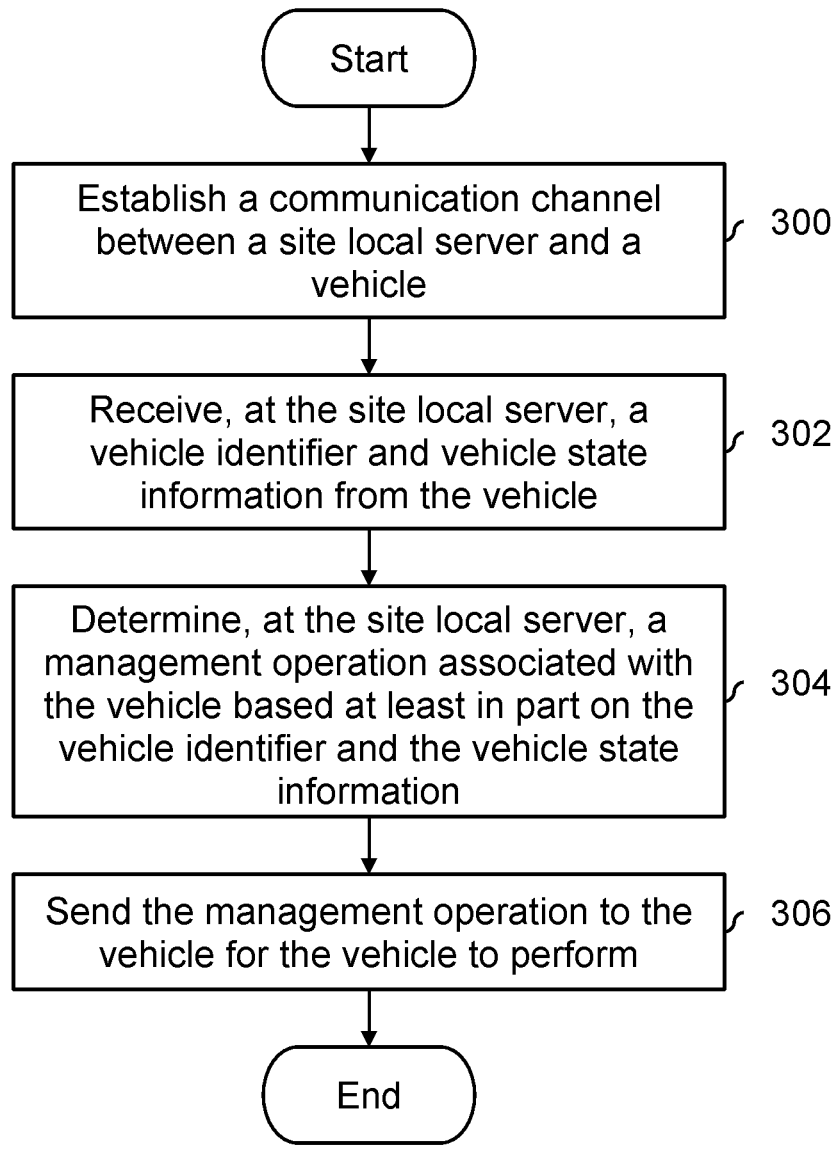
FIG. 3 is a flowchart illustrating an embodiment of a process to manage a vehicle using a site local server.

FIG. 3 is a flowchart illustrating an embodiment of a process to manage a vehicle using a site local server. In this example, the process is performed by the site local server. As described above, in some embodiments, the site local server is located in an area with a slow, unreliable, and/or expensive communication channel to a central server.

At 300, a (e.g., wireless) communication channel between a site local server and a vehicle is established. In one example, a vehicle and a site local server communicate over a WiFi channel. In some embodiments, all site local servers and vehicles are configured to search for and/or use the same communication channel (identifier) (e.g., always search for and/or use a particular hostname, IP address, MAC address, etc.). This may be desirable in some applications where the vehicle does not stay in the same area. As the vehicle moves from one local area network (LAN) to another, it will encounter and communicate with different site local servers in different areas. By using the same communication channel (identifier), the vehicle can seamlessly connect with a site local server in the same area without having to be reprogrammed each time.

In some embodiments, the communication channel is established using a variety of security techniques. The following figure describes one example.

Figure 4:
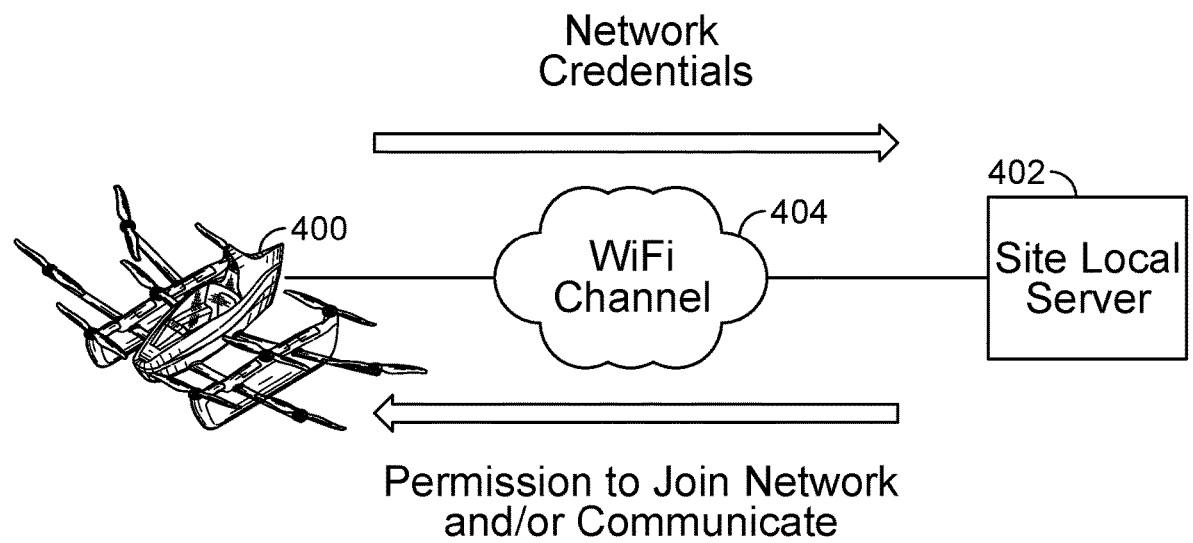
FIG. 4 is a diagram illustrating an embodiment of establishing a communication channel using a hidden network and a password, sometimes referred to as a (private key).

FIG. 4 is a diagram illustrating an embodiment of establishing a communication channel using a hidden network and a password, sometimes referred to as a (private key). In this particular example, the vehicle (400) and the site local server (402) communicate over a WiFi channel or network (404) which is a hidden WiFi network where the SSID is not broadcast by the site local server. The vehicle is configured with the correct SSID ahead of time and therefore is able to establish a connection or communication channel with the site local server over the hidden WiFi channel.

In addition to being hidden, in this example, the WiFi channel uses a password and the vehicle is (also) configured with the correct password ahead of time. The password or, more generally, network credentials, are sent from the vehicle to the site local server, and are used to authenticate or otherwise verify the vehicle before the vehicle is permitted to communicate with and/or establish a communication channel with the site local server. If the network credentials are proper or correct, the site local server indicates to the vehicle that the vehicle is permitted to join the network and/or communicate with the site local server.

In some embodiments, the network credentials that are sent to the site local server include the vehicle identifier. As will be described in more detail below, since the site local server already stores vehicle identifiers for all vehicles (e.g., to determine the management operation), in some embodiments, the vehicle identifier is included in the network credentials that are sent to the site local server and are used by the site local server to verify or otherwise authenticate the vehicle.

In some embodiments, each vehicle has its own unique (network) credentials. For example, this may be desirable for security reasons. If a particular vehicle's credentials or other authentication information is compromised, then access can be turned off for the comprised credentials while still giving access to other vehicles which have uncompromised credentials. Or, for whatever reason, if it is desired to turn off access for and/or communication with a particular vehicle, unique (network) credentials for each vehicle support this capability.

Returning to FIG. 3, at 302, at the site local server, a vehicle identifier and vehicle state information are (e.g., wirelessly) received from the vehicle. For example, FIG. 5 describes an example of this.

Figure 5:
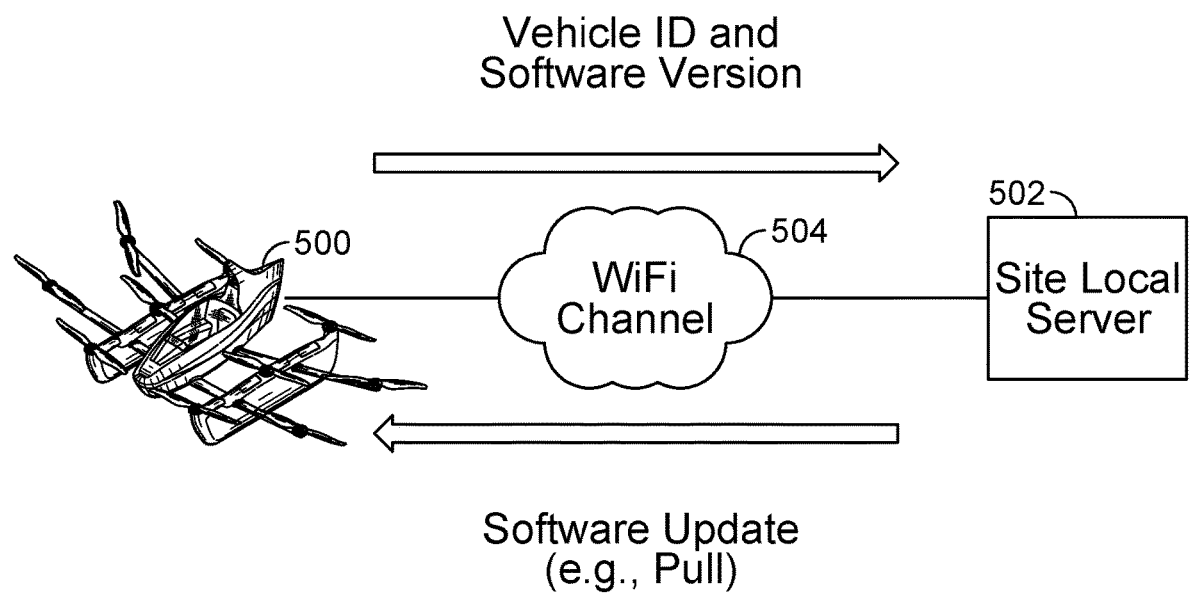
FIG. 5 is a diagram illustrating an embodiment of a software update that is sent to a vehicle based on a vehicle identifier and a software version.

FIG. 5 is a diagram illustrating an embodiment of a software update that is sent to a vehicle based on a vehicle identifier and a software version. In this example, the site local server (502) is used to provide software updates to vehicles, such as vehicle (500). As such, the vehicle state information in this example includes information associated with the (e.g., currently) loaded version(s) of software that is/are running on the vehicle. In this example, the vehicle sends its vehicle identifier and the version(s) of the software that is/are running on the vehicle to the site local server via a WiFi channel (504).

In some embodiments, the vehicle state information is a hash (e.g., of the software binary, sometimes referred to as an image) that uniquely identifies the particular software version (or combination of versions). In some embodiments, the vehicle state information is log and/or flight information recorded during the last trip or flight. For example, this may include battery related information, sensor information, etc.

Returning to FIG. 3, at 304, at the site local server, a management operation associated with the vehicle is determined based at least in part on the vehicle identifier and the vehicle state information. For example, in FIG. 5, the site local server (502) may maintain a table or database of all vehicles and what software version(s) each vehicle should have (e.g., target or desired software version(s)). The target software version(s) are compared against the reported software version(s) and if they do not match, it is determined that a software update should be performed (e.g., as an example of a management operation).

In another example, the management operation is in response to some identified anomaly or error in a vehicle. For example, the site local server may maintain acceptable ranges for reported information. If any of the vehicle state information received from a particular vehicle is out of the acceptable range (e.g., flight controller went into an error state, one of the batteries is too hot, or an excessive amount of power was consumed for the given flight path, loads, thrusts, etc.), then an anomaly or error is flagged. In some cases, the management operation is a non-disruptive action that does not directly or immediately interfere with the user's ability to control the vehicle. For example, there may be a warning or message presented to the user in a display that the user should return the vehicle to some maintenance yard or facility for servicing.

In some embodiments, a management operation intervenes in a user's ability to fly or otherwise control the vehicle to a greater degree. In some embodiments, the vehicle is prohibited from being flown or driven. For example, this may be done in cases where an anomaly or error has been identified where it would be dangerous for the vehicle to fly. Or, the central server may send to all site local servers an instruction to ground certain vehicle(s). This may be a useful management tool for rented vehicles located in remote locations but which still need to be controlled.

In another example, a management operation only permits a flight or travel path to return the vehicle to a maintenance yard or other location. For example, if the user has ignored repeated, earlier warnings to return the vehicle to a maintenance yard, then the management operation may prevent the vehicle from flying to places other than the maintenance yard. The vehicle may be switched over to a fully autonomous mode that automatically flies the vehicle to the maintenance yard, or a semiautonomous mode where the vehicle is only permitted to be flown along a flight path to the maintenance yard (e.g., the vehicle ignores instructions to move in other directions).

Returning to FIG. 3, at 306, the management operation is (e.g., wirelessly) sent to the vehicle for the vehicle to perform. For example, if the management operation is associated with a software update, the update is sent to the vehicle for installation. Or, the management operation may be associated with presenting a warning or some other message to the user. In some cases, the management operation (when performed by the vehicle) intervenes in the user's ability to fly or otherwise control the vehicle.

In some embodiments, the vehicle state information includes log data associated with the vehicle and determining the management operation includes analyzing the log data to determine whether there is an anomaly associated with the vehicle. In the event it is determined that there is an anomaly associated with the vehicle, the management operation is associated with taking the vehicle in for service. For example, this may include displaying a notification to a user that the vehicle needs to go in for service, switching to an autonomous flight mode where the vehicle autonomously flies to a maintenance or service center (e.g., when unoccupied or after a user is done with the vehicle), or switching to a flight mode where the vehicle is grounded until it can be picked up for service (e.g., in the case of a severe anomaly where it might be dangerous for the vehicle to fly or drive).

In some embodiments, the vehicle state information includes a loaded version of software on the vehicle and the management operation is associated with ensuring that the vehicle has a specified version of the software. In some embodiments, the controller includes a table that associates the vehicle, identified by a first vehicle identifier, with a less restrictive version of the software and associates a second vehicle, identified by a second vehicle identifier, with a more restrictive version of the software. In some embodiments, the site local server further includes a local data repository with the second version of the software and the vehicle performs the management operation including by pulling at least some of the second version of the software from the local data repository in the site local server. In some embodiments, the at least some of the second version of the software is pulled from the local data repository in the site local server while the vehicle is airborne and the version of the software on the vehicle is changed from the first version to the second version while the vehicle is on the ground.

In some embodiments (e.g., in addition to and/or as an alternative sending the management operation to the vehicle to be performed), information is sent to a central server in response to the processing of the information at step 304. For example, due to the slow and/or unreliable nature of the communication channel between a central server and a site local server, it may be desirable to limit the amount of information that is uploaded to the central server. In one example where the site local server analyzes vehicle log information to identify any anomalies in the vehicle, the site local server only sends anomaly related information to the central server when an anomaly is detected. This may be desirable because the log files may be relatively large and it would be undesirable to upload the log files to the central server. In some embodiments, log data for vehicles with flagged or identified anomalies is sent to the central server but not for vehicles with no flagged or identified anomalies (e.g., because if an anomaly is detected it is worth the cost and/or bandwidth for the central server and/or other entities to have the log data available for analysis).

One of the benefits associated with a site local server is that it permits vehicles to be managed without the vehicle having to land. The following figures show an example of this.

Figure 6A:
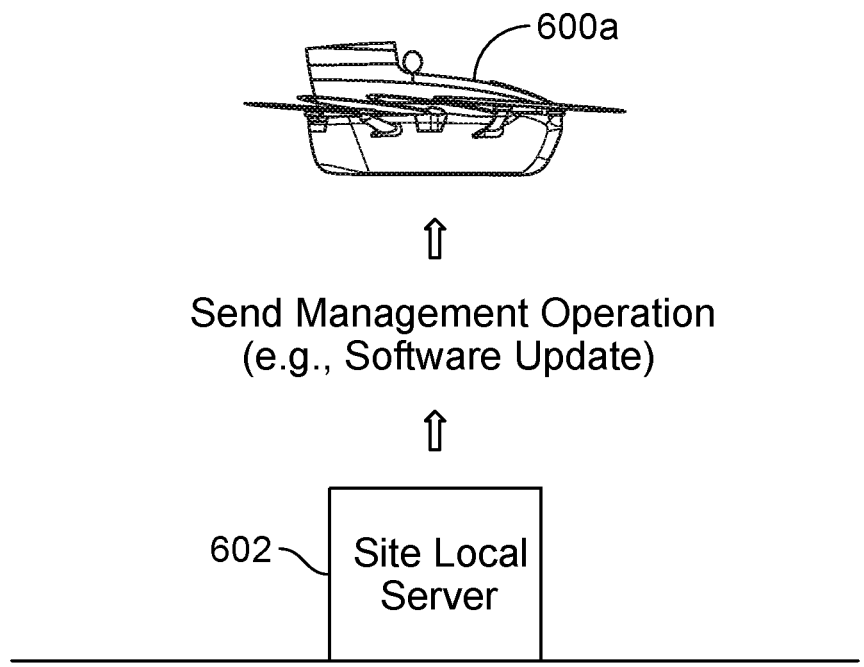
FIG. 6A is a diagram illustrating an embodiment of a vehicle that is airborne when it receives a management operation from a site local server.

FIG. 6A is a diagram illustrating an embodiment of a vehicle that is airborne when it receives a management operation from a site local server. In this example, the vehicle (600a) has sent its vehicle identifier and vehicle state information to the site local server (602) while airborne (not shown). In response, the site local server determines the appropriate management operation and sends it to the vehicle as shown here. The vehicle does not perform the operation immediately upon receipt but rather waits to land, as shown in the following figure.

Figure 6B:
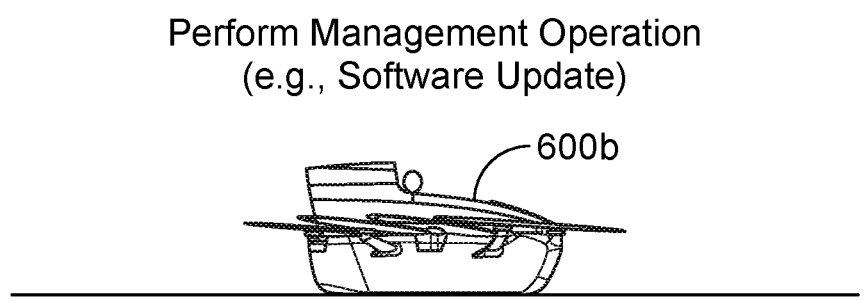
FIG. 6B is a diagram illustrating an embodiment of a vehicle that is on the ground when it performs a management operation.

FIG. 6B is a diagram illustrating an embodiment of a vehicle that is on the ground when it performs a management operation. FIG. 6B continues the example of FIG. 6A. In the state shown here, the vehicle (600b) has landed and is now in a state associated with where it is permitted to perform the management operation. For example, if the management operation is to update software, it would be undesirable to perform the update while airborne.

In one example application, the site local server (e.g., 602 in FIG. 6A) is located at a crossroads or along a popular flight path where vehicles frequently fly or otherwise pass by. This permits management operations to opportunistically receive (send) information from (to) vehicles as vehicles fly or otherwise pass by. For example, this may be desirable in recreational applications where the vehicles operate within some area or follow some path or track and are in use almost constantly. If a problem or anomaly in one of the vehicles developed in the middle of the day (where in this example the vehicle is in use almost constantly throughout the day), the issue could be detected with a site local server almost immediately and any intervention could occur sooner rather than later. In contrast, if the vehicle is only checked or otherwise managed at the end of the day (e.g., when it is plugged in at some maintenance yard), it might be impossible to detect an anomaly in the early stages and intervene before serious damage and/or harm occurs.

In such fly-by scenarios, there may be a limited window of time for the vehicle and site local server to exchange information. In some embodiments, the site local server and/or vehicle has a protocol or technique in place so that the information can be exchanged in fragments, to minimize or otherwise reduce the duplicate resending of information which has already been exchanged. For example, suppose the vehicle is sending a log file (which is relatively large) to the site local server. In one example, they split it into groups of different importance and send more important ones first with group identifiers so that they can pick up where they left off. Or, if a new binary (or portion of a binary) is being sent from the site local server to the vehicle, then they may split the binary into chunks with sequence number, then send over the pair of a chunk and a sequence number so that the new binary is sent over in chunks or fragments.

The following figures describe a more specific example of a site local server and how a software update may be performed using a site local server. This is merely one example and is not intended to be limiting.

Figure 7:
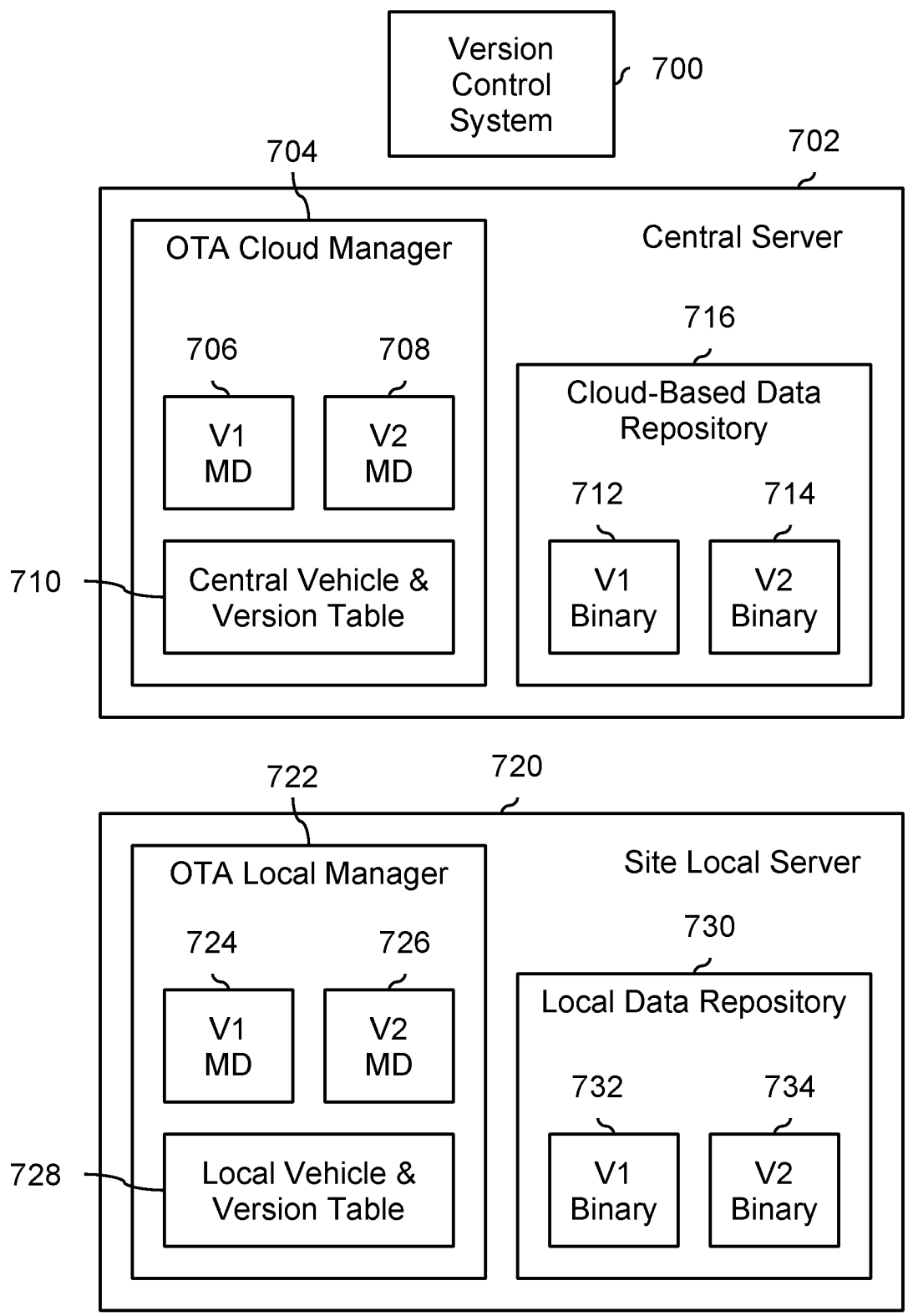
FIG. 7 is a diagram illustrating an embodiment of a system which includes a site local server and a cloud-based central server.

FIG. 7 is a diagram illustrating an embodiment of a system which includes a site local server and a cloud-based central server. In this example, software updates are released by a version control system (700). For example, software changes or updates may be written and stored in version control system (700). Once these changes or updates have been sufficiently verified, they are released to the central server (702).

In this example, the central server (702) is cloud-based and over-the-air (OTA) cloud manager (704) acts as the (communications) interface for the central server (702). In some embodiments, central server (108) in FIG. 1 is implemented as shown here. In this example, the OTA cloud manager is accessible via a particular URL or website. In this example, the metadata (e.g., (706 and 708)) associated with the various software versions is stored in the OTA cloud manager (704) whereas the corresponding software (e.g., V1 binary (712) and V2 binary (714), respectively) is stored in cloud-based data repository (716). For example, the metadata may include the software version number, tags created by a programmer, run environment information (e.g., the type of processor, operating system, or platform that the software is designed to run on or in), etc. In this example, V1 metadata (706) is the metadata for V1 binary (712) and V2 metadata (708) is the metadata for V2 binary (714).

The OTA cloud manager (704) also has its version of a vehicle and (software) version table (710). In this example, the table is used to track both the loaded version of software that each vehicle is running, as well as the version of software that each vehicle should be running. As described above, the table permits each vehicle to have a particular version of software (if desired) independent of the other vehicles.

The site local server (720) has a similar arrangement where the OTA local manager (722) includes software metadata (724 and 726) and a table (728), and the local data repository (730) includes the software binaries (732 and 734). The OTA local manager updates its metadata (724 and 726) from the metadata (706 and 708) in the OTA cloud manager (704). Similarly, the local data repository (730) updates its binaries (732 and 734) from the binaries (712 and 714) on the cloud-based data repository (716). An OTA local manager is sometimes more generally referred to as a communications interface and controller.

In some embodiments, the local data repository (730) is used to store other information in addition to and/or as an alternative to software binaries. For example, the repository may be used to store log data from the vehicle. The log data may be very large but "dumping" the log data to the site local server may permit the vehicle to free up its local memory (e.g., so that new log data can be stored thereon). In some embodiments (e.g., where the server to server channel is relatively slow and/or unreliable), the log data is only rarely passed up to the central server and the log data is deleted after the site local server is done analyzing and/or processing it. In some other embodiments (e.g., where the server to server channel is relatively fast and/or reliable), the log data is temporarily buffered until it is uploaded to the central server.

If the central table (710) has more recent information than the local table (728), then the local table is updated. For example, suppose that some administrator decided that a given vehicle should use a particular version of software and logged in to the OTA cloud manager to make this change. That change would be made in the central table (710) and subsequently the local table (728) would be updated with this information. In some cases, the local table has more recent information. For example, an administrator in the field may decide that it is better or safer for a vehicle at that site to use a different version of software. The administrator may log in or otherwise access the OTA local manager (722) in the field and change the local table (728) to reflect that decision. This change is subsequently propagated from local table (728) to central table (710). The vehicle would then be updated with that newly-specified version of the software (e.g., which requires the pilot to rely on autonomous flight for some aspects of flying such as taking off and landing, a version with reduced altitude limits, reduced speed limits, and/or (more generally) a more conservative flight experience, etc.).

In some embodiments, the tables (e.g., (710 and 728)) are implemented as a sort of chain or sequence where each change is appended to the table instead of overwriting a corresponding association. For example, if a user logs on to the OTA cloud manager (704) to change the version of software associated with a particular vehicle, then that association (e.g., vehicle <vehicle_ID>, version <hash>) is appended to the table instead of overwriting the association between the vehicle and a previous version. In some embodiments, each entry or association is timestamped. For example, this may help to reconstruct the various changes or associations over time and/or help propagate changes between different tables in the system.

As described above, in some embodiments, a communication channel is implemented using a wired channel (e.g., for security reasons) and the components are modified accordingly. For example, if a vehicle and a site local server communicated over a wired channel (as opposed to a wireless channel) for security reasons, in such embodiments, the OTA local manager in the site local server would be replaced by a wired equivalent since communication is no longer performed over the air. For example, this wired connection may include or be part of an adaptor or connector with charging capabilities as well.

The following figures continue the example shown here and walk through example states associated with a vehicle and a site local server as an update between version V1 and V2 is performed.

Figure 8A:
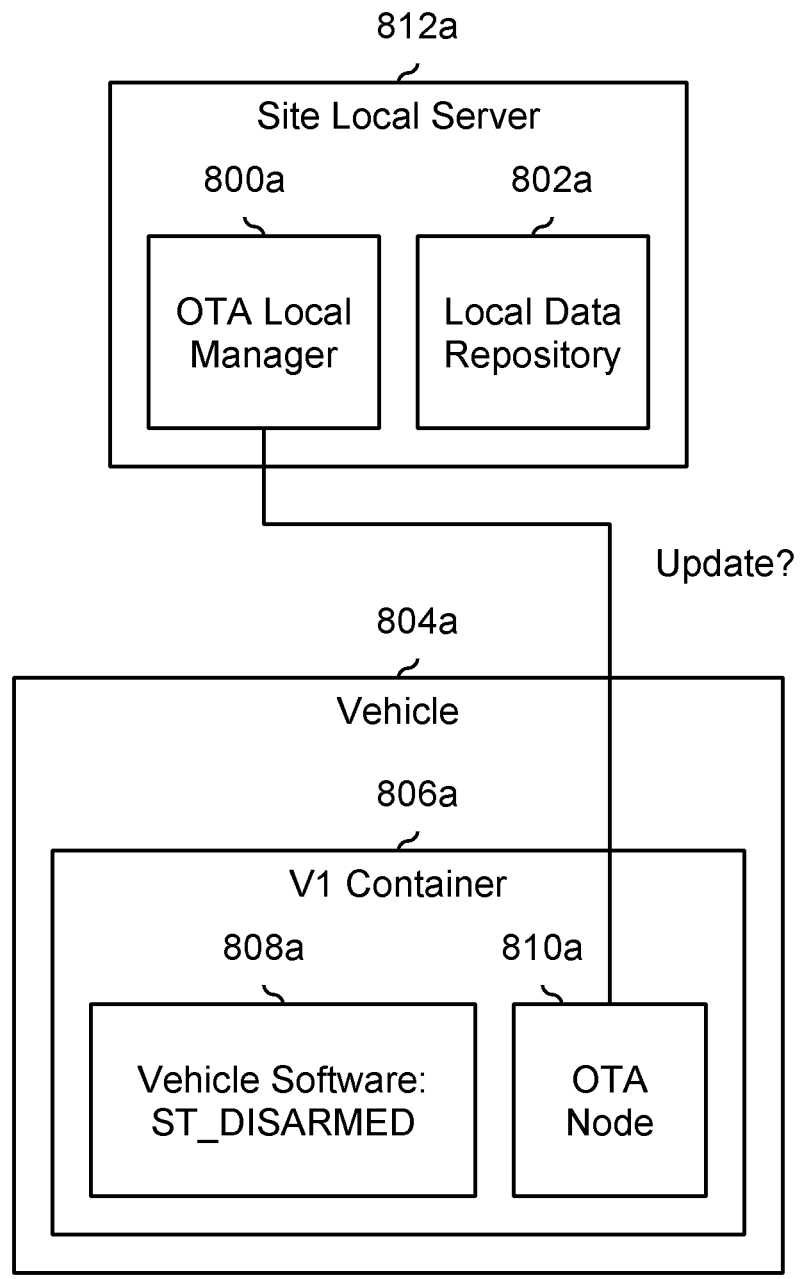
FIG. 8A is a diagram illustrating an embodiment of a site local server and a vehicle at a first point in time.

FIG. 8A is a diagram illustrating an embodiment of a site local server and a vehicle at a first point in time. To preserve the readability of the figure and for brevity, the elements or components in OTA local manager (800a) (e.g., version metadata (724 and 726) and local vehicle and version table (728) in FIG. 7) and local data repository (802a) (e.g., binaries (732 and 734) in FIG. 7) are not shown here.

In the example shown here, the vehicle (804a) has a container (806a) associated with version V1 of the software. The V1 container (806a) in turn includes the vehicle software (808a) which is running and in this example is in the state ST_DISARMED. For example, this state may be associated with the vehicle being on the ground and/or with the propellers off. In some embodiments, the vehicle and site local server are permitted to check for updates in other vehicle states (e.g., while the vehicle is hovering or otherwise flying, in addition to and/or as an alternative to the state ST_DISARMED, etc.).

The V1 container (806a) also includes an OTA node (810a) which interfaces and/or communicates with the OTA local manager (800a) in the site local server (812a). In the state shown here, the OTA node (810a) and OTA local manager (800a) communicate with each other (e.g., as described above) to determine whether or not there is a software update for vehicle (804a). In this example there is an update and OTA node (810a) requests the software update from OTA local manager (800a).

In some embodiments, the communication channel between the vehicle (804a) and the site local server (812a) is a wireless channel that exchanges information using the HTTPS protocol instead of the less secure HTTP protocol. For example, the vehicle (804a) and the site local server (812a) would have one or more keys which would permit them to communicate using the more secure HTTPS protocol.

Figure 8B:
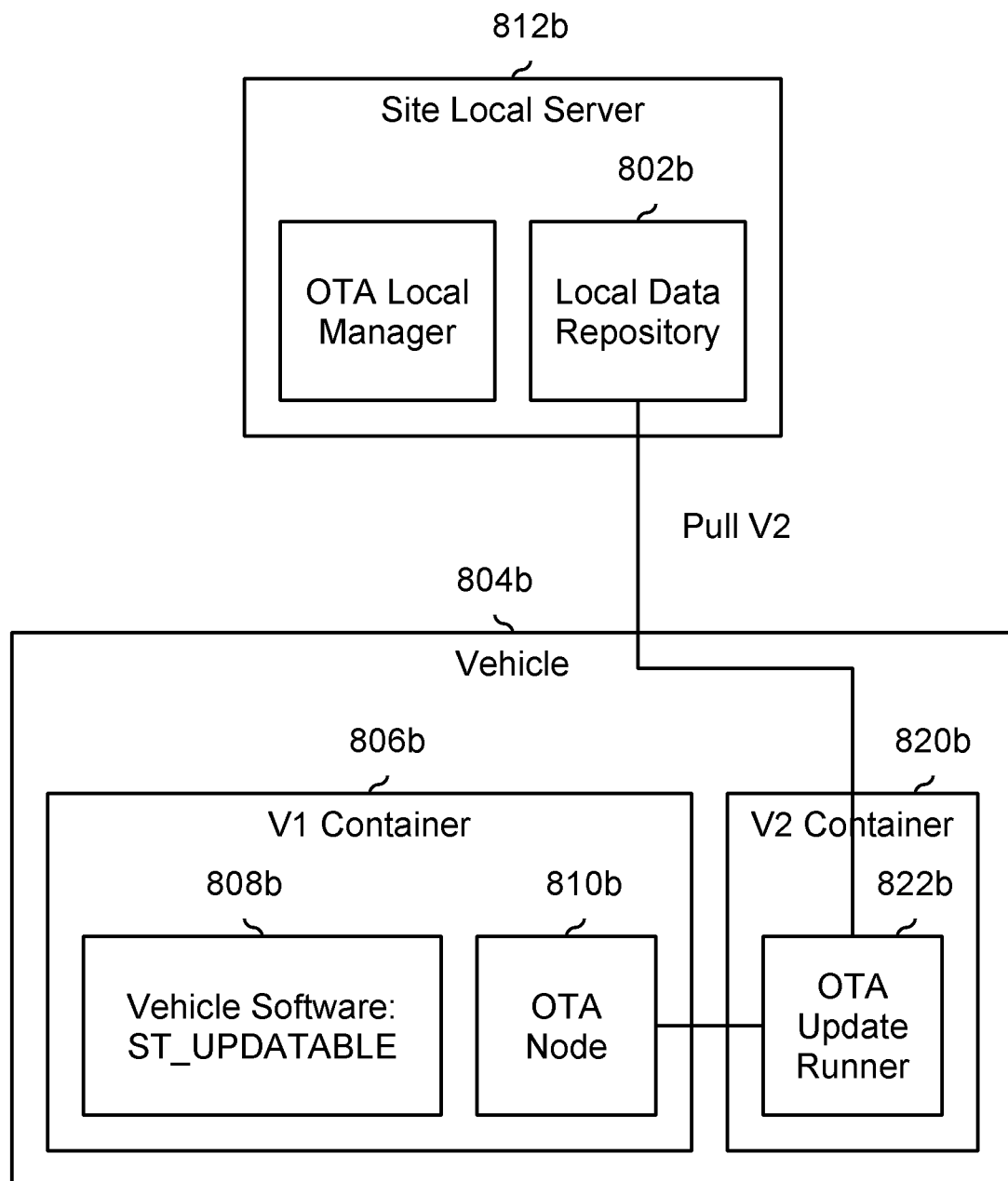
FIG. 8B is a diagram illustrating an embodiment of a site local server and a vehicle at a second point in time.

FIG. 8B is a diagram illustrating an embodiment of a site local server and a vehicle at a second point in time. FIG. 8B continues the example of FIG. 8A. In the example state shown here, a second container (820b) associated with version V2 of the software has been created in the vehicle (804b) since the state shown in FIG. 8A. For example, the OTA node (810b) in the V1 container (806b) creates the V2 container (820b) and starts OTA update runner (822b). The OTA update runner (822b) in the V2 container (820b) communicates with the local repository data (802b) to download a copy of the V2 binary (see, e.g., V2 binary (734) in FIG. 7) to OTA update runner (822b). In this example, the vehicle software (808b) is in a state (in this example, ST_UPDATABLE) in which it is permitted to download (a version of) software from local data repository in this state. Otherwise, OTA update runner (822b) would have waited. A copy of the V2 binary (not shown here to preserve the readability of the figure, as described above) is then stored in OTA update runner (822b). In some embodiments, differences in the V1 and V2 binaries are downloaded so that some duplicate portions of the V2 binary which have not changed from the V1 binary are not necessarily downloaded.

In some embodiments, before the V2 container (820b) on the vehicle (804b) is permitted to pull the V2 binary from the local data repository (802b), the vehicle (or some component thereon, such as the V2 container (820b) or the OTA update runner (822b)) is required to present credentials (e.g., a username and password) to the site local server (812b) or some component thereon. This authentication step may be required each time and/or these credentials may be different from and/or independent of any credentials used to establish the (in this example, wireless) communication channel between the vehicle and the site local server. In some embodiments, such credentials to obtain the V2 binary are unique for each vehicle. Similarly, a server to server channel may be similarly secured.

Figure 8C:
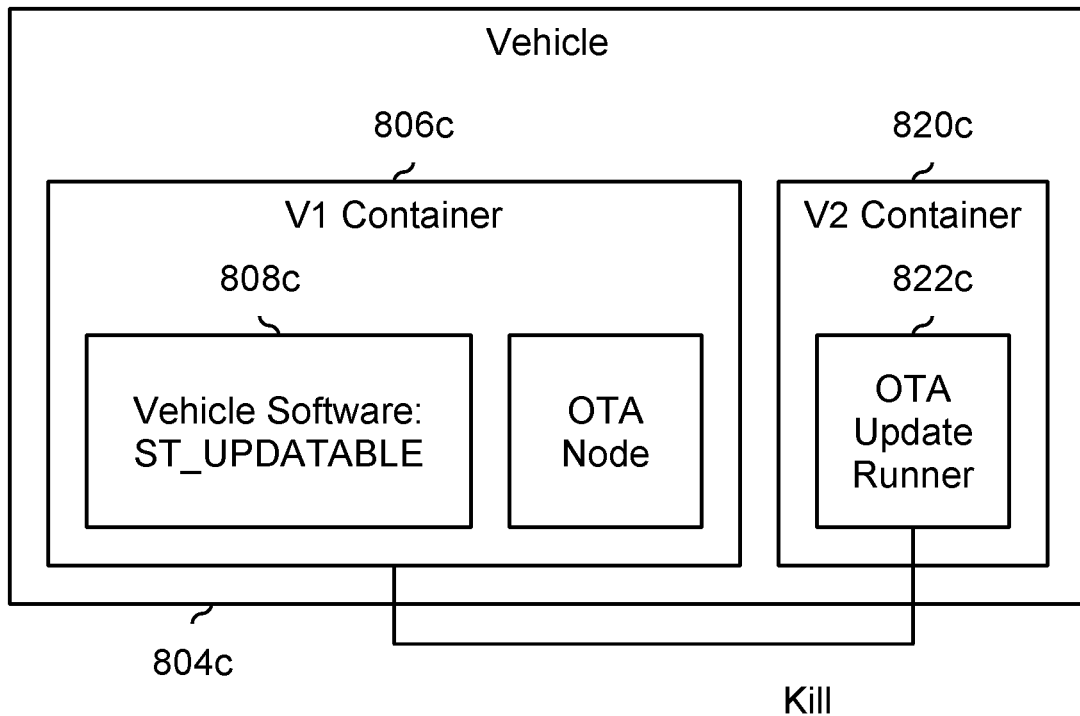
FIG. 8C is a diagram illustrating an embodiment of a vehicle at a third point in time.

FIG. 8C is a diagram illustrating an embodiment of a vehicle at a third point in time. FIG. 8C continues the example of FIG. 8B. In the example state shown here, the OTA update runner (822*c*) in the V2 container (820*c*) has finished downloading the V2 version of the software (not shown). The OTA update runner checks the state of the vehicle software (808*c*) in the V1 container (806*c*); in the state shown here it is in the ST_UPDATABLE state. For example, in FIG. 8B, the state may have transitioned from the state ST_DISARMED to the state ST_UPDATABLE as part of the update check performed there. In this example, the vehicle software may remain in the ST_UPDATABLE so long as the vehicle (804*c*) remains inactive (e.g., the vehicle is not instructed to turn off or take off).

Returning to FIG. 8C, since the ST_UPDATABLE is a state in which a transition from V1 to V2 is permitted, the OTA update runner is allowed to (and does) send a kill instruction to the V1 container (806*c*). In some other states, the OTA update runner would not necessarily be permitted to kill the V1 container.

Once the V1 container (806*c*) has been killed, the OTA update runner creates another V2 container and starts the vehicle software in the V2 container.

Figure 8D:
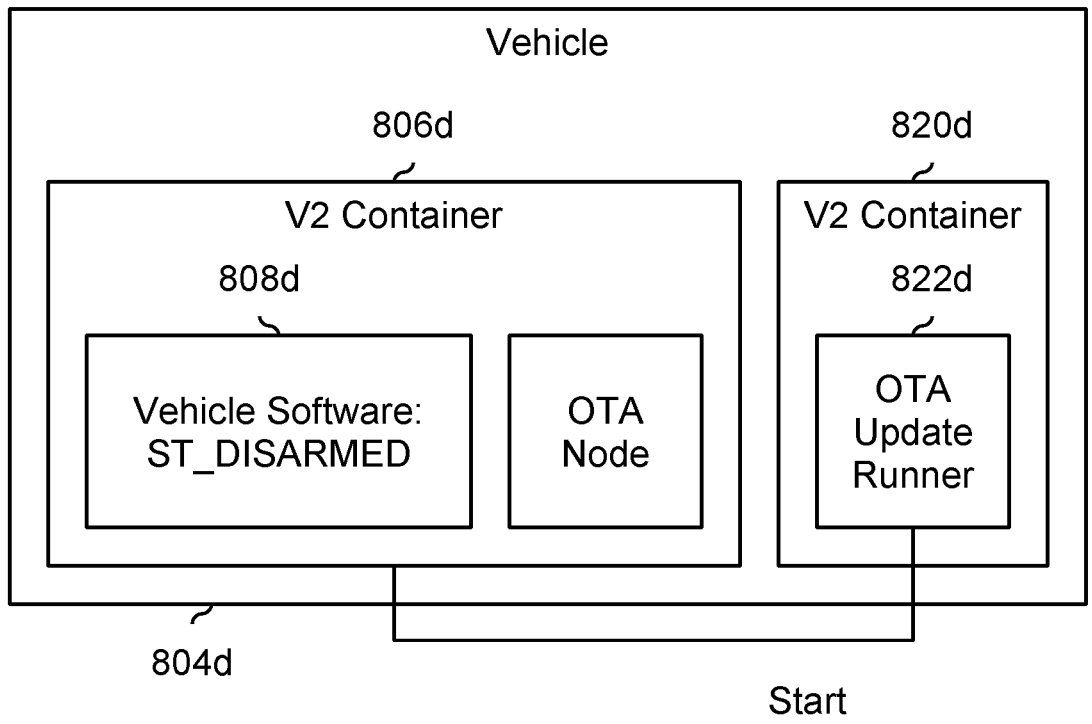
FIG. 8D is a diagram illustrating an embodiment of a vehicle at a fourth point in time.

FIG. 8D is a diagram illustrating an embodiment of a vehicle at a fourth point in time. FIG. 8D continues the example of FIG. 8C. The OTA update runner (822*d*) in the other V2 container (820*d*) starts the updated V2 container (806*d*). In this example, when the vehicle software (808*d*) starts up, it enters the ST_DISARMED state as shown here. In this example, FIGS. 8C and 8D occur while the vehicle is on the ground (in the case where the vehicle is an aircraft) and/or was off. The vehicle software (808*d*) remains in the ST_DISARMED state until the vehicle (804*d*) is turned on, for example, prior to and/or in anticipation of takeoff.

Figure 8E:
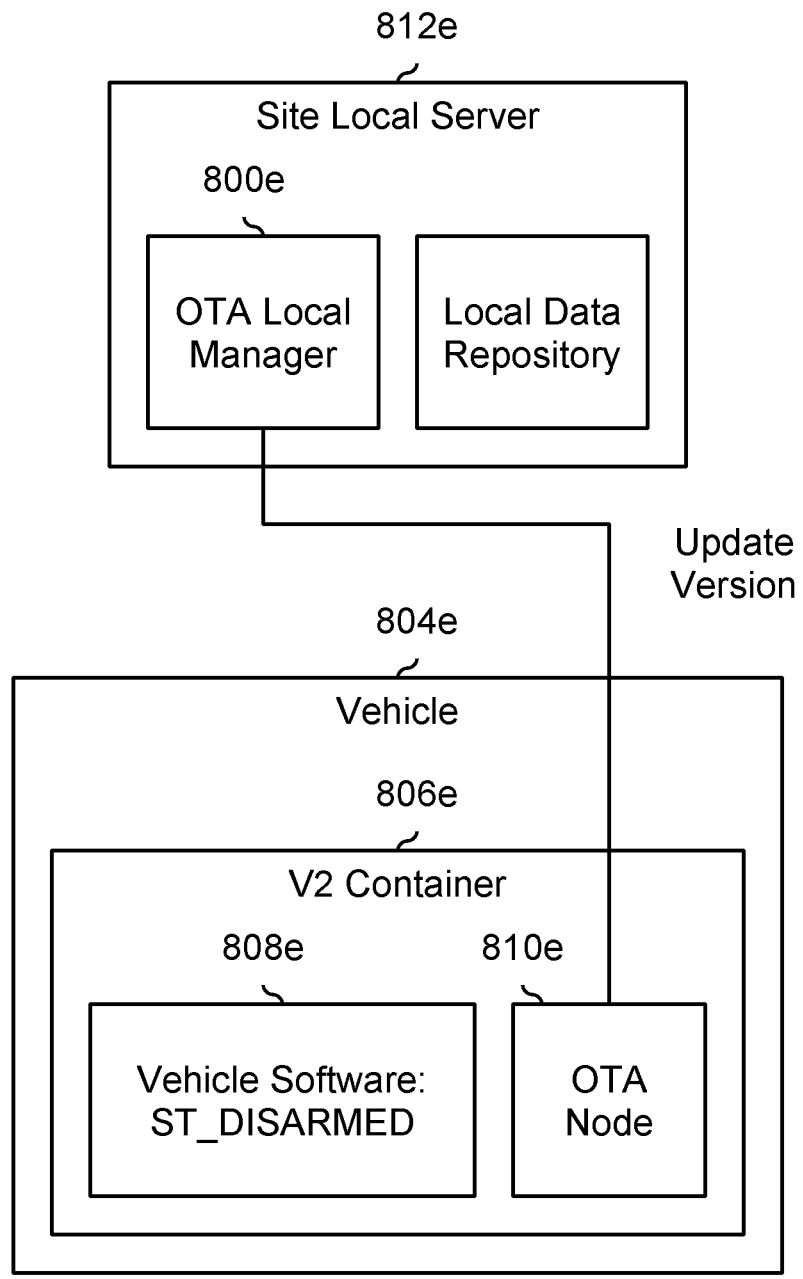
FIG. 8E is a diagram illustrating an embodiment of a vehicle at a fourth fifth point in time.

FIG. 8E is a diagram illustrating an embodiment of a vehicle at a fifth point in time. FIG. 8E continues the example of FIG. 8D. The OTA update runner (822*d*) from FIG. 8D has completed its job and therefore V2 container (820*d*) and OTA update runner (822*d*) are no longer needed and are removed from the vehicle as shown in FIG. 8E.

With the V2 container (806*e*) running in the vehicle (804*e*), this information is passed to the site local server (812*e*). In this example, OTA node (810*e*) communicates with the OTA local manager (800*e*) to update the version that the vehicle (804*e*) is using or otherwise has (e.g., from version V1 to V2). For example, the local vehicle and version table (728) in OTA local manager (722) in FIG. 7 may be updated with this information.

Although the vehicle software (808*e*) is in the ST_DISARMED state when the version update occurs, it is not necessary for the vehicle software to be in this state when the update occurs (e.g., because this update could occur while the vehicle software is in a (more) active state without meaningfully endangering and/or interfering with a flight or other trip).

In some embodiments, the software that is updated using the techniques and/or systems described herein includes a library, IP core, utility, service, or other component that is used by firmware or other software to run. For example, controlling the update of a library or other component (e.g., in addition to the firmware and/or other software) may be desirable because then compatible versions of firmware (as an example) and libraries can be updated simultaneously with appropriate versions. This may prevent situations where a library is updated by some other entity and the system gets into a state where the library and the firmware (as an example) that are loaded onto a system are incompatible, or where the flight controller software (as an example) is tested with one package or version of libraries and IP but is loaded onto a vehicle with some other package or version of libraries. For example, such an incompatibility may occur if a new library version is released but there is some time before the firmware is updated to switch over to the new version of the library. In some embodiments, each component or assest can be independently updated so that any combination of versions can be supported.

It is important to ensure that the vehicle is not interrupted between killing the old V1 container (see, e.g., FIG. 8C) and starting the new V2 container (see, e.g., FIG. 8D) because this would leave the vehicle unusable and/or in an unrecoverable state. In some embodiments, to prevent this, an instruction to kill a container associated with a previous version (e.g., FIG. 8C) and an instruction to start a container associated with a next version (e.g., FIG. 8D) are stored in non-volatile memory (e.g., so the instructions persist even in the event power is lost) and/or in a location that will be accessed or reviewed for instructions to execute even after an interruption, such as a loss of power. For example, in some embodiments, the kill and start instructions are performed by a (Linux) kernel which will ensure that the instructions are saved and performed even in the event of an interruption and/or power loss.

In some embodiments, the system is used to more quickly debug software. The following figure shows an example of this.

Figure 9:
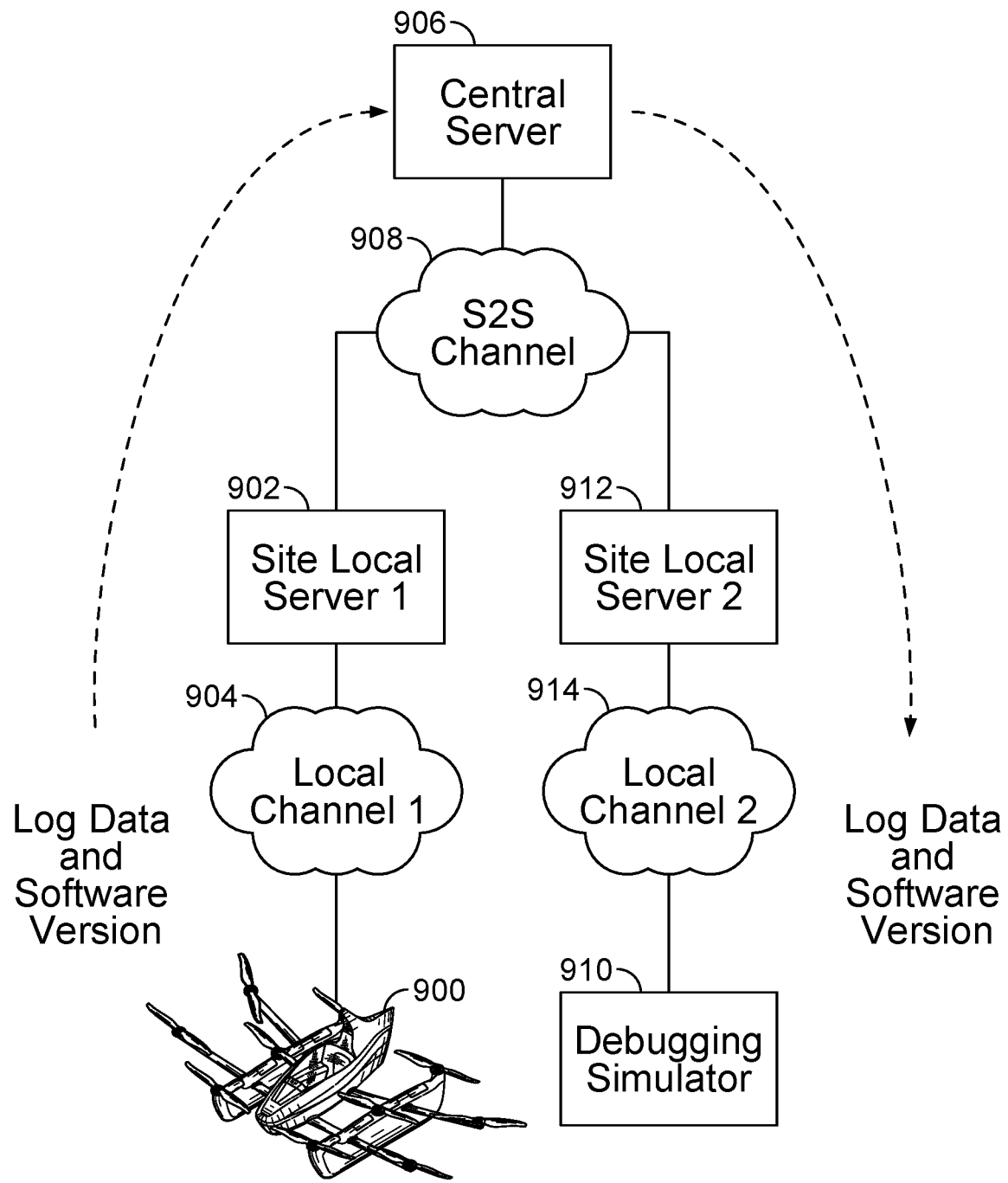
FIG. 9 is a diagram illustrating an embodiment of a system that configures a debugging simulator to match a vehicle being debugged.

FIG. 9 is a diagram illustrating an embodiment of a system that configures a debugging simulator to match a vehicle being debugged. In this example, a vehicle (900) is located remotely from one or more software developers. Log data (which may be relatively large) is sent from vehicle (900) to a first site local server (902) via a first local channel (904). For example, the first local channel (904) may be a WiFi channel and the first site local server (902) and vehicle (900) are within WiFi range of each other where site local server (902) acts as the WiFi router and/or access point. The site local server processes and/or analyzes the log files from the vehicle and identifies an anomaly. However, the site local server is not able to more specifically identify the issue and/or bug, and is only generally aware that there is some sort of problem and/or issue that should be resolved.

In this example, the software version used by the vehicle (900) and the log data from the vehicle (900) are passed from the site local server to a central server (906) via a server to server channel (908) in response to detecting an anomaly. The log information and software version from the vehicle are used to program or otherwise configure a debugging simulator (910) so that it is configured or otherwise programmed the same as the vehicle (e.g., with the same software version(s), with the same settings, etc.). In some embodiments, the debugging simulator includes the same motherboard and electronic components that are in use in a vehicle to better debug the problem.

Like the vehicles that are managed by the system, the debugging simulator also has a vehicle identifier associated with it (at least in this example). In response to the anomaly that is identified or otherwise detected in vehicle (900), the central vehicle and version table (not shown) in the central server is changed (at least in this example) so that the vehicle identifier associated with the debugging simulator will have the same software version as the vehicle. This will cause the debugging simulator to be updated (if needed) with the version of software that vehicle (900) uses. For example, if needed, the software on the debugging simulator (910) will be changed to be the version used by the vehicle (900) using the binary stored on the second site local server (912) and downloaded to the debugging simulator (910) via the second local channel (914). In one example, the second site local server (912) and debugging simulator (910) are located in the same software development building where the software developer(s) work.

The configuration change (e.g., of the local and/or central tables so that the debugging simulator will be updated, if needed, to have the same software version(s) as the vehicle) may occur automatically or manually. For example, the central server may update its central vehicle and version table in response to the anomaly being detected. Or, a software developer may manually change the version that the debugging simulator should have to be the version in use by the vehicle in one of the local tables (e.g., in the second site local server (912)) or by logging in to the central server to change the central table.

Some or all of the log data from the vehicle (900) is also passed to the debugging simulator (910). For example, the log data may include stimuli or inputs into the debugging simulator to recreate the conditions experienced by the vehicle when the anomaly occurred. For example, the log data may include environmental information (e.g., cross winds, if any), vehicle state information (including any desired forces and moments), etc. With debugging, the first step is being able to recreate the anomaly or problem, and having the actual log data when the problem occurred and configuring the debugging simulator quickly with the same version of the software enables software developers to more quickly and/or accurately diagnose the problem and proceed with fixing it. For example, if the anomaly is a software bug, once the anomaly is able to be recreated, a possible bug fix can be written, tested, and released (e.g., via a version control system (not shown) which stores and manages software versions (e.g., including the binaries and associated metadata)). In some embodiments, the debugging simulator is coupled or otherwise connected to the version control system (e.g., through a network connection) to support the writing, testing, and/or releasing of a new software version.

In some embodiments, some of the log data from the vehicle is not passed on beyond the first site local server (902). For example, because the log data is very large (e.g., on the order of 100 GB), it may be undesirable to pass along information that is not instructive or illuminating in the debugging process. As such, in the event of a failure of a single component of the system, information in the log data that does not directly interact with the component does not go beyond the first site local server (902). However, other pieces of log information (e.g., which are of use and/or interest) are passed along to the debugging simulator (910).

In some embodiments, for safety, the vehicle (900) is disabled or otherwise not permitted to fly while the root problem is diagnosed and/or until a bug fix is available. In one automated example, the log data includes sensor information, such as one or more battery temperatures measured by temperature probes inside of or outside of the batteries. The first site local server (902) may have a range of acceptable battery temperatures and if a measured battery temperature is outside of that range, the site local server is configured to identify this (e.g., by analyzing or processing the log files of a vehicle) and if this scenario is detected, configure the vehicle so that it is not permitted to fly. In some embodiments, (un)acceptable ranges, states, and/or conditions which the site local server checks log data for is maintained in a table in the site local server (e.g., so that the table can be updated and the same checks enforced system wide).

In some embodiments, a table which stores vehicle and version information appends new entries to the table rather than overwriting older entries. The following figure shows an example of this.

FIG. 10 is a diagram illustrating an embodiment of a table that stores vehicle and version information by appending new entries to the table. In some embodiments, table 710 and table 728 in FIG. 7 are implemented as shown. In this example, the table includes a user identifier column (1000) which identifies the user that created or otherwise added a new entry, a vehicle identifier (1002) which identifies the vehicle in question, a version identifier (1004) which identifies a version of software (e.g., by version number, tags, etc.), and a timestamp (1006) at which the (new) vehicle-version association was created or otherwise added to the table.

In the example shown here, the first entry in the table (1010) was created by "Engineer_1" at a timestamp of "Jan-1-2019, 14:28:12" and associates "Vehicle_1" with version "A01." This would cause the specified vehicle ("Vehicle_1") to be loaded with the specified software version ("A01").

The second entry in the table (1012) is created by a different user ("Engineer_2") and associates the same vehicle ("Vehicle_1") with a different and/or newer version of software ("B01"). This second timestamp ("Mar-15-2019, 10:28:12") for the second entry is later than the first timestamp ("Jan-1-2019, 14:28:12") associated with the first entry. In this example, instead of overwriting the first entry (e.g., because they have the same vehicle identifier in column 1002), the second entry (1012) is appended to the table so that the first entry (1010) is preserved.

A few minutes after the second entry was created or added, a third entry (1014) with a third timestamp ("Mar-15-2019, 10:32:50") is added to the table. For example, a new vehicle ("Vehicle_2") may have been added to the fleet and the third entry associates that vehicle with the most recent software version ("B01") so that the vehicle is loaded with that version of software.

One benefit to appending entries to a table (as shown here) is that auditing can be performed. For example, for security, it may be desirable to know which user added or otherwise created a new association or entry to the table. In one example, if someone's login credentials were compromised, it may be useful to know what changes were made by the user and when. Another benefit to appending entries to a table with a timestamp is that it can help to resolve conflicts or collisions (e.g., if two users try to change which version of software is associated with a given vehicle). Yet another benefit is the ability to construct a snapshot in time of what version of software each vehicle had at a given time for the entire system. For example, the version ID column (1004) may include a "should have" version ID column as well as an "actually has" (i.e., loaded) version column where in some cases the two values are not the same (e.g., because the update is pending).

Another benefit to the system shown is that a programmer can remotely and securely access vehicle information to debug issues. The following figure shows an example of this.

Figure 11:
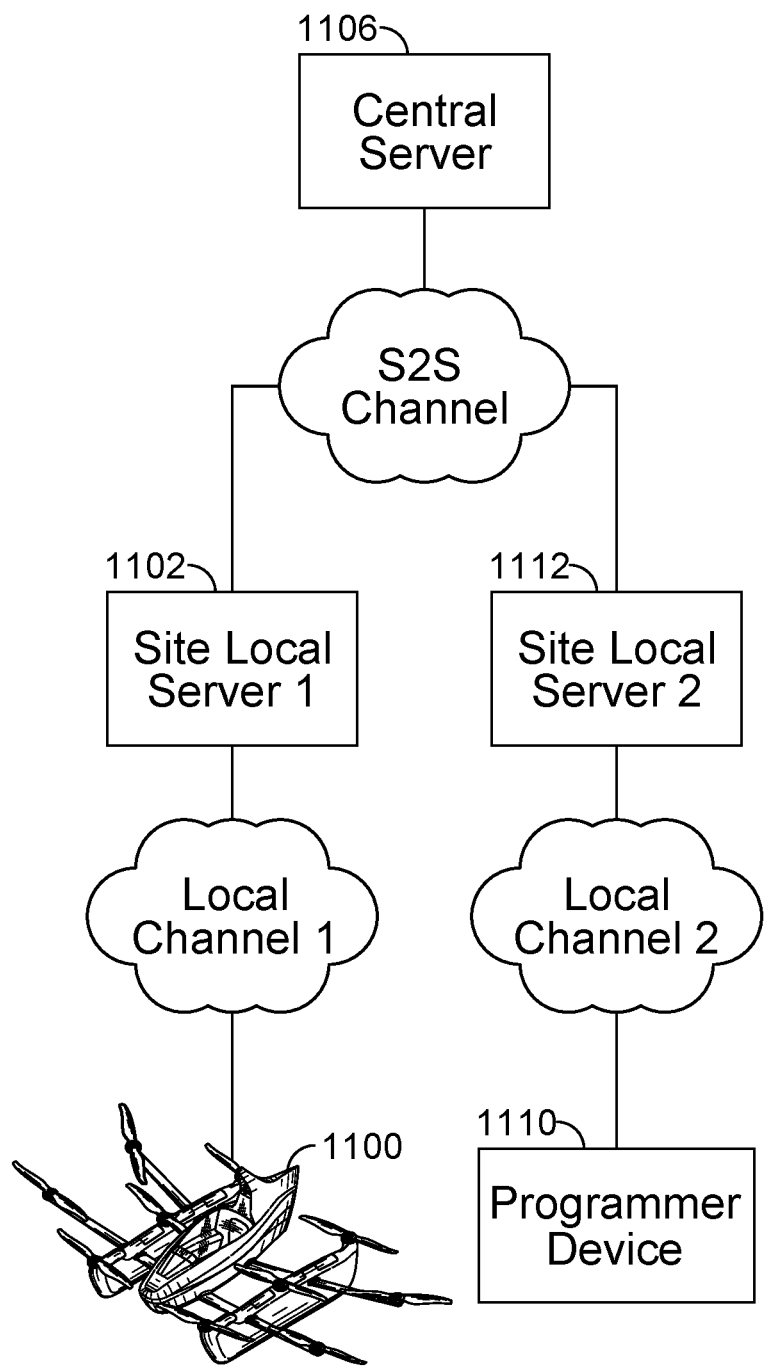
FIG. 11 is a diagram illustrating an embodiment of a system that permits a device to securely and remotely access a vehicle being debugged.

FIG. 11 is a diagram illustrating an embodiment of a system that permits a device to securely and remotely access a vehicle being debugged. In this example, a vehicle (1100) is located in the field and needs to be debugged. However, the programmer and/or debugger is located in an office. In this example, a secure tunnel is created from the programmer device (910), such as a computer, to the vehicle (1100) which permits the programmer to remotely and securely access the vehicle and debug it. In this example, a secure tunnel (e.g., a SSL tunnel) is created from the first site local server (1102) to the central server (1106). Similarly, a secure tunnel is created (e.g., directly) from the programmer's device (1110), such as their computer, to the central server (1106) (e.g., without going through or via the second site local server (1112)). At the central server (1106), any communications that are received from the programmer's device (1110) are forwarded to the first site local server (1102) via the secure tunnel and vice versa. This permits communication between the two end-to-end devices without having to expose (as an example) an SSL service on the site local servers (e.g., 1102) which would be vulnerable to attack. In this example, the central server (1106) is protected by a firewall and/or is more secure than the site local servers (e.g., 1102). This prevents a vulnerable port or service (e.g., the SSL service) from being exposed by the less secure device (e.g., site local servers tend to be less secure than the central server). This enables a programmer or debugger to quickly and remotely access a vehicle in a secure manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electronic vertical takeoff and landing (eVTOL) multicopter, comprising:
   a communications interface configured to:
      establish a communication channel between a site local server and the eVTOL multicopter; and
      send a vehicle identifier and vehicle state information from the eVTOL multicopter to the site local server, wherein the vehicle state information includes a loaded version of software on the eVTOL multicopter; and
   a processor configured to perform a management operation received from the site local server, wherein:
      the site local server is configured to determine the management operation based at least in part on the vehicle identifier and the vehicle state information,
      the management operation is associated with ensuring that the eVTOL multicopter has a specified version of the software, and
      a controller of the site local server includes a table that associates the eVTOL multicopter, identified by a first vehicle identifier, with a less restrictive version of software and associates a second eVTOL multicopter, identified by a second vehicle identifier, with a more restrictive version of the software.

2. The eVTOL multicopter recited in claim 1, wherein:
   the vehicle state information includes log data associated with the eVTOL multicopter;
   the site local server determines the management operation including by analyzing the log data to determine whether there is an anomaly associated with the eVTOL multicopter; and
   in the event it is determined that there is an anomaly associated with the eVTOL multicopter, the management operation is associated with taking the eVTOL multicopter in for service.

3. The eVTOL multicopter recited in claim 1, wherein the site local server further includes a local data repository with a second version of the software; and
   the eVTOL multicopter performs the management operation including by: pulling at least some of the second version of the software from the local data repository in the site local server.

4. The eVTOL multicopter recited in claim 1, wherein the site local server further includes a local data repository with a second version of the software; and
   the eVTOL multicopter performs the management operation including by:
      pulling at least some of the second version of the software from the local data repository in the site local server while the eVTOL multicopter is airborne; and
      changing the version of the software on the eVTOL multicopter from the loaded version to the second version while the eVTOL multicopter is on the ground.

5. An electronic vertical takeoff and landing (eVTOL) multicopter, comprising:
   a communications interface configured to:
      establish a communication channel between a site local server and the eVTOL multicopter; and
      send a vehicle identifier and vehicle state information from the eVTOL multicopter to the site local server; and
   a processor configured to perform a management operation received from the site local server, wherein:
      the site local server is configured to determine the management operation based at least in part on the vehicle identifier and the vehicle state information;
      the vehicle state information includes log data associated with the eVTOL multicopter;
      determining the management operation includes analyzing the log data to determine whether there is an anomaly associated with the eVTOL multicopter; and
      a controller of the site local server includes a table that associates the eVTOL multicopter, identified by a first vehicle identifier, with a less restrictive version of the software and associates a second eVTOL multicopter, identified by a second vehicle identifier, with a more restrictive version of the software.

6. The eVTOL multicopter recited in claim 1, wherein:
   the controller includes a table that includes a first entry that associates the eVTOL multicopter with a first version of the software; and
   updating the table includes appending a second entry that associates the eVTOL multicopter with a second version of the software to the table.

7. A method, comprising:
   establishing a communication channel between a site local server and an electronic vertical takeoff and landing (eVTOL) multicopter;
   receiving, at the site local server, a vehicle identifier and vehicle state information from the eVTOL multicopter, wherein the vehicle state information includes a loaded version of software on the eVTOL multicopter; and
   determining, at the site local server, a management operation associated with the eVTOL multicopter based at least in part on the vehicle identifier and the vehicle state information, wherein:
      the management operation is associated with ensuring that the eVTOL multicopter has a specified version of the software, and
      a controller of the site local server includes a table that associates the eVTOL multicopter, identified by a first vehicle identifier, with a less restrictive version of software and associates a second eVTOL multicopter, identified by a second vehicle identifier, with a more restrictive version of the software; and sending the management operation to the eVTOL multicopter for the eVTOL multicopter to perform.

8. The method recited in claim 7, wherein:
the vehicle state information includes log data associated with the eVTOL multicopter;
the site local server determines the management operation including by analyzing the log data to determine whether there is an anomaly associated with the eVTOL multicopter; and
in the event it is determined that there is an anomaly associated with the eVTOL multicopter, the management operation is associated with taking the eVTOL multicopter in for service.

9. The method recited in claim 7, wherein:
the site local server further includes a local data repository with a second version of the software; and
the eVTOL multicopter performs the management operation including by: pulling at least some of the second version of the software from the local data repository in the site local server.

10. The method recited in claim 7, wherein:
the site local server further includes a local data repository with a second version of the software; and
the eVTOL multicopter performs the management operation including by:
pulling at least some of the second version of the software from the local data repository in the site local server while the eVTOL multicopter is airborne; and
changing the version of the software on the eVTOL multicopter from the loaded version to the second version while the eVTOL multicopter is on the ground.

11. A method, comprising:
establishing a communication channel between a site local server and an electronic vertical takeoff and landing (eVTOL) multicopter;
receiving, at the site local server, a vehicle identifier and vehicle state information from the eVTOL multicopter; and
determining, at the site local server, a management operation associated with the eVTOL multicopter based at least in part on the vehicle identifier and the vehicle state information, wherein:
the vehicle state information includes a loaded version of software on the eVTOL multicopter and log data associated with the eVTOL multicopter;
determining the management operation includes analyzing the log data to determine whether there is an anomaly associated with the eVTOL multicopter based at least in part on a table that associates the eVTOL multicopter, identified by a first vehicle identifier, with a less restrictive version of the software and associates a second eVTOL multicopter, identified by a second vehicle identifier, with a more restrictive version of software; and
sending the management operation to the eVTOL multicopter for the eVTOL multicopter to perform.

12. The method recited in claim 7, wherein:
the controller includes a table that includes a first entry that associates the eVTOL multicopter with a first version of the software; and
updating the table includes appending a second entry that associates the eVTOL multicopter with a second version of the software to the table.

13. A computer program product, the computer program product being embodied in a non-transitory computer readable storage medium and comprising computer instructions for:
establishing a communication channel between a site local server and an electronic vertical takeoff and landing (eVTOL) multicopter;
receiving, at the site local server, a vehicle identifier and vehicle state information from the eVTOL multicopter, wherein the vehicle state information includes a loaded version of software on the eVTOL multicopter;
determining, at the site local server, a management operation associated with the eVTOL multicopter based at least in part on the vehicle identifier and the vehicle state information, wherein:
the management operation is associated with ensuring that the eVTOL multicopter has a specified version of the software, and
a controller of the site local server includes a table that associates the eVTOL multicopter, identified by a first vehicle identifier, with a less restrictive version of the software and associates a second eVTOL multicopter, identified by a second vehicle identifier, with a more restrictive version of the software; and
sending the management operation to the eVTOL multicopter for the eVTOL multicopter to perform.

14. The computer program product recited in claim 13, wherein:
the vehicle state information includes log data associated with the eVTOL multicopter;
the site local server determines the management operation including by analyzing the log data to determine whether there is an anomaly associated with the eVTOL multicopter; and
in the event it is determined that there is an anomaly associated with the eVTOL multicopter, the management operation is associated with taking the eVTOL multicopter in for service.

15. The computer program product recited in claim 13, wherein:
the controller includes a table that includes a first entry that associates the eVTOL multicopter with a first version of the software; and
updating the table includes appending a second entry that associates the eVTOL multicopter with a second version of the software to the table.

16. A computer program product, the computer program product being embodied in a non-transitory computer readable storage medium and comprising computer instructions for:
establishing a communication channel between a site local server and the eVTOL multicopter; and
sending a vehicle identifier and vehicle state information from the eVTOL multicopter to the site local server; and
performing a management operation received from the site local server, wherein:
the site local server is configured to determine the management operation based at least in part on the vehicle identifier and the vehicle state information;
the vehicle state information includes log data associated with the eVTOL multicopter;

determining the management operation includes analyzing the log data to determine whether there is an anomaly associated with the eVTOL multicopter; and a controller of the site local server includes a table that associates the eVTOL multicopter, identified by a first vehicle identifier, with a less restrictive version of software and associates a second eVTOL multicopter, identified by a second vehicle identifier, with a more restrictive version of the software.

\* \* \* \* \*